Aug. 25, 1931.  M. J. McRAE  1,820,817
SALT SHAKER, ETC
Filed Nov. 8, 1929
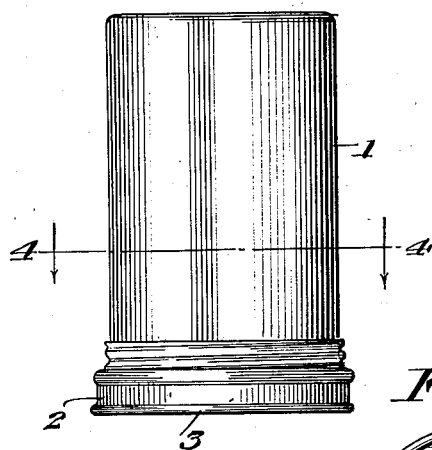
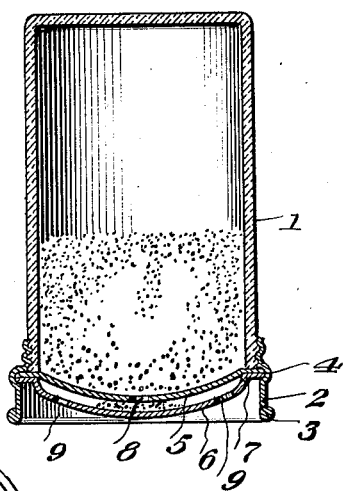
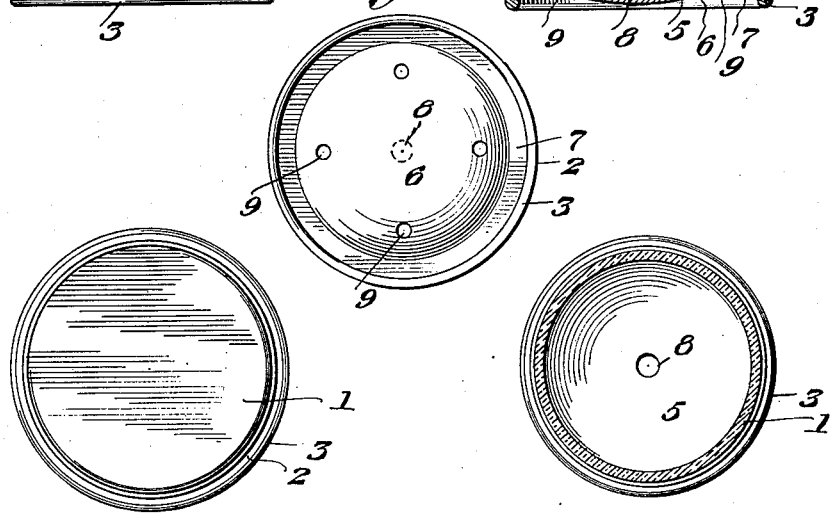
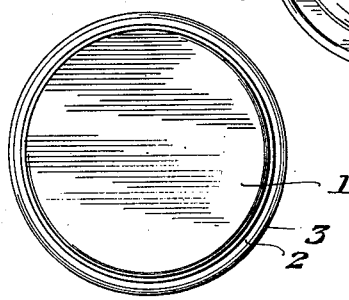
Martin J. McRae
INVENTOR
BY Victor J. Evans
ATTORNEY Patented Aug. 25, 1931

1,820,817

UNITED STATES PATENT OFFICE

MARTIN J. McRAE, OF SPOKANE, WASHINGTON

SALT SHAKER, ETC.

Application filed November 8, 1929. Serial No. 405,774.

This invention relates to a shaker for salt, etc., the general object of the invention being to provide a shaker having a base part with openings therein which are so arranged that some of the contents of the shaker will pass through the openings by giving the device a slight shaking motion and by arranging the openings in the base, the contents are protected from insects, dirt, moisture and the like, and the openings are covered when the device is placed on a table or other support.

Another object of the invention is to so construct and arrange the parts that the holes can be made larger than usual so that there is no danger of the device being clogged and it can be used with either coarse or fine material without danger of the material running too freely from the device, as the discharge of the material depends wholly on the amount of shaking of the device.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation of the device.

Figure 2 is a vertical sectional view thereof.

Figure 3 is a top plan view.

Figure 4 is a section on line 4—4 of Figure 1.

Figure 5 is a bottom plan view.

In these views, the numeral 1 indicates the body of the device which is preferably formed of one piece of material, with its lower end open and its upper end closed. The lower end is formed with threads to receive the threaded upper portion of a ring 2 which has a bead 3 at its lower end for engaging a surface on which the device is set. The ring is shaped to provide an annular groove 4 intermediate its ends to receive the peripheries of the disks 5 and 6. These disks are each of concavo-convex shape, with their concaved faces uppermost and the disk 6 is offset adjacent its periphery, as shown at 7, so that this disk is spaced from the disk 5 to leave a space between the two disks. The top disk 5 is formed with a central opening 8 and the disk 6 is formed with a number of openings 9 which are arranged in a concentric row. The disk 6 is so shaped that it will not contact the surface on which the article rests, as shown in Figure 2.

From the foregoing it will be seen that the ring 2 forms a complete closure for the interior of the device when the same rests upon a surface, thus preventing insects and dirt and dust from reaching the contents. It will also be seen that some of the material will pass through the hole 8 in the top disk and enter the space between the two disks, but this material cannot escape through the holes 9, due to the location of such holes. However, when it is desired to secure some of the contents, the device is picked up and given a slight shaking motion so that the material in the space between the two disks will pass to the holes 9 and drop through the same. The amount of material passing from the device is wholly controlled by the amount of shaking action imparted to the body. As before stated, there is no danger of the device becoming clogged, as the holes can be made larger than ordinary and there is no danger of the material dropping from the device until it is shaken, due to the fact that the holes 9 are spaced from the center of the device and in the raised portion of the disk 6.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A condiment holder of the class described comprising a body having its lower end open, a pair of disks covering the open end and having their major portions spaced apart, means for supporting the disks and the upper disk having a centrally arranged hole therein and the other disk having a row of concentric holes therein.

2. A device of the class described comprising a body having its lower end open, a pair of disks, each of concavo-convex shape with the concaved face uppermost, the disks being spaced apart, means for holding the edge of the upper disk against the open end of the body and the second disk with its edge against the edge of the first disk, the upper disk having a centrally arranged hole therein and the lower disk having a row of concentric holes therein.

3. A shaker of the class described comprising a body having its upper end closed and its lower end open, a ring detachably connected with the lower end, a pair of disks carried by the ring and closing the open end of the body, each disk being of concavo-convex shape with the major portions of the disks spaced apart and with the lowermost part of the lower disk above the plane of the lower edge of the ring, the upper disk having a centrally arranged opening therein and the lower disk having a concentric row of openings therein spaced an appreciable distance from the center of said lower disk.

In testimony whereof I affix my signature.

MARTIN J. McRAE.